2 Sheets—Sheet 1.

T. V. CURTIS & A. M. ANDREWS.
Meal Heater and Steamer.

No. 199,962. Patented Feb. 5, 1878.

WITNESSES
Nat. E. Oliphant
W. Schuyler Johnson

INVENTORS
Thomas V. Curtis.
A. Milton Andrews.
per Chas. H. Fowler.
Attorney.

2 Sheets—Sheet 2.

T. V. CURTIS & A. M. ANDREWS.
Meal Heater and Steamer.

No. 199,962. Patented Feb. 5, 1878.

WITNESSES
Nat. E. Oliphant
H. Schuyler Johnson

INVENTORS
Thomas V. Curtis,
A. Milton Andrews.
per Chas. H. Fowler,
Attorney.

N. PETERS, PHOTO-LITHOGRAPHER, WASHINGTON, D. C.

UNITED STATES PATENT OFFICE.

THOMAS V. CURTIS AND A. MILTON ANDREWS, OF LE MARS, IOWA.

IMPROVEMENT IN MEAL HEATER AND STEAMER.

Specification forming part of Letters Patent No. 199,962, dated February 5, 1878; application filed December 20, 1877.

*To all whom it may concern:*

Be it known that we, THOMAS V. CURTIS and A. MILTON ANDREWS, of Le Mars, in the county of Plymouth and State of Iowa, have invented a new and valuable Improvement in Meal Heater and Steamer; and we do hereby declare that the following is a full, clear, and exact description of the construction and operation of the same, reference being had to the annexed drawings, making a part of this specification, and to the letters and figures of reference marked thereon.

Figure 1:
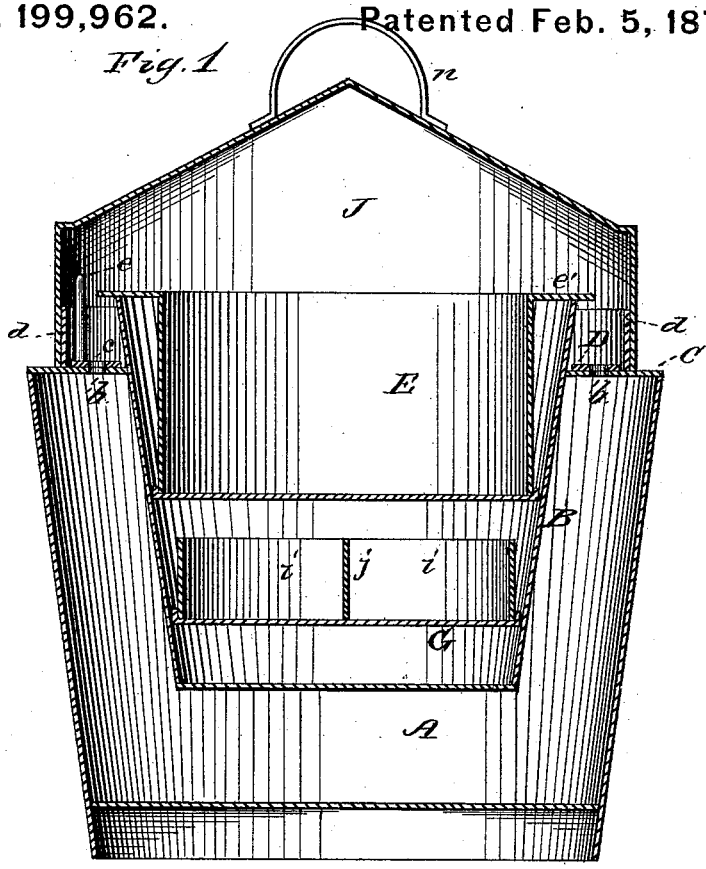
Figure 2:
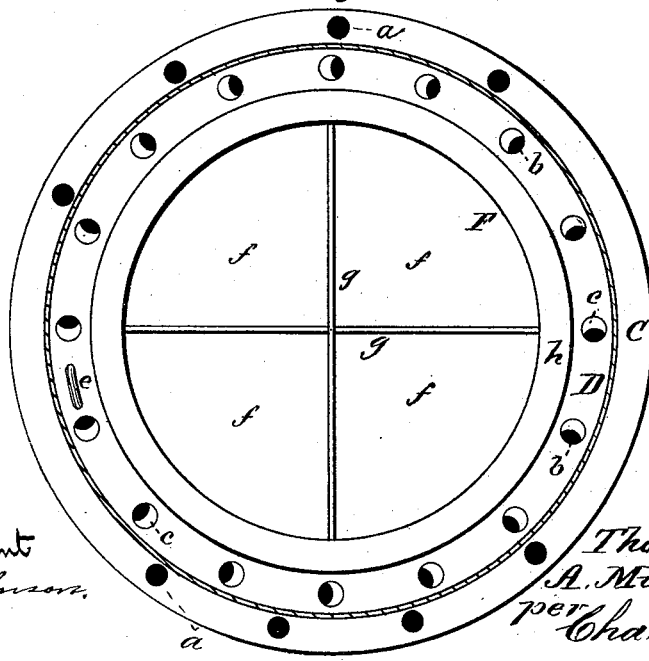
Figure 3:
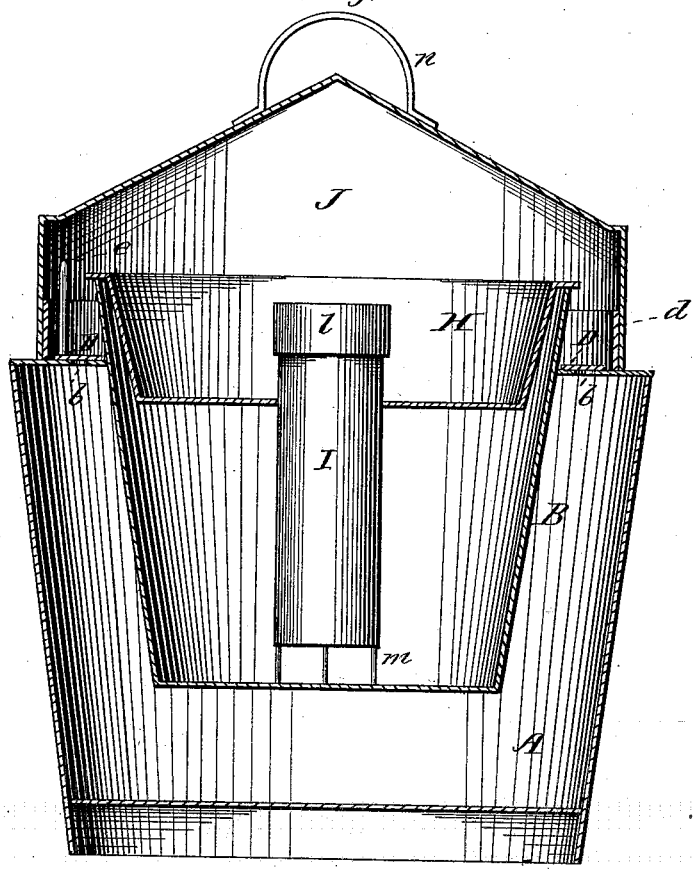
Figure 4:
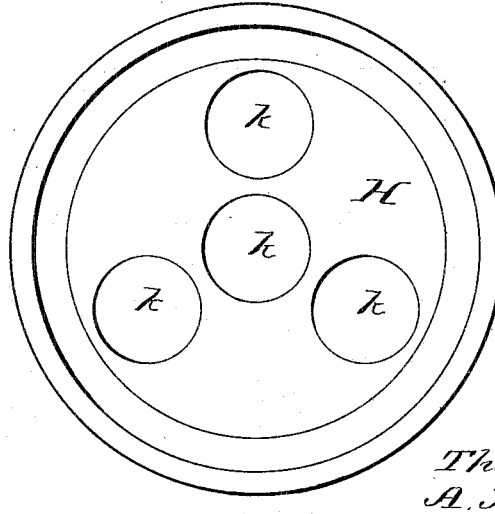

Figure 1 of the drawing is a representation of a longitudinal vertical section of our invention. Fig. 2 is a plan view. Fig. 3 is a vertical longitudinal section of the kettle and steamer, with the frame and cylindrical vessel connected thereto. Fig. 4 is a plan view of the frame for holding the cooking and warming vessel within the steamer.

This invention has relation to devices known as "meal warmers and steamers," which may be used for either or both purposes, as necessity requires; and the invention consists in the general construction and combination of the several parts, as will be hereinafter described, and subsequently pointed out in the claims.

In the accompanying drawings, A represents a kettle, of any suitable form and construction, which receives the devices constituting the meal warmer and steamer. B represents the steamer, which may be used for various purposes, such as warming milk, making soups of any kinds, stews, pot-pies, or beef-tea. This steamer B is formed with a circumferential flange, C, which rests upon the top of the kettle A, and supports the steamer within the same at a suitable distance from the bottom thereof.

The flange C has holes $a$, any suitable distance apart, to allow a sufficient amount of steam to escape, so that when the cut-off D is closed the pressure of steam within the kettle will not be great enough to raise the steamer. Around the inside of the flange C are openings $b$, which are designed to allow a portion of the steam to pass inside of the meal warmer or steamer, to keep the victuals inside of the same from drying, and the quantity of steam may be regulated by a cut-off, D, having corresponding openings $c$, which slide within the space formed by the vertical flange $d$, and is operated by a suitable handle, $e$.

This steamer may contain several different utensils, used for various purposes to which the steamer may be adapted.

In describing the several devices, E represents a pan used for the purpose of stewing, and is formed with a rim, $e'$, for suspending it within the steamer B, and F and G are receptacles for keeping eatables warm, the former being divided into compartments $f$ by partitions $g$, and having an annular rim, $h$, which rests upon the vertical flange $h'$, or upper rim of the steamer B, so as to suspend it within the same.

The meal-warmer G is also divided into compartments $i$ by a partition, $j$, and fits within the steamer B. The object of the compartments is to separate the several different varieties of food.

A frame, H, is suspended within the steamer B, and has one or more holes, $k$, sufficient in size to receive one or more cylindrical vessels I, provided with covers $l$, and at the lower end of said vessel are secured legs $m$, to prevent the bottom from coming in contact with the bottom of the steamer. If desired, the frame H may be made to fit inside of the stew-pan, or in any kettle or cooking-range.

By the employment of the vessel I, either solids or liquids may be warmed or cooked, as found necessary when a perfectly air-tight vessel is required.

A cover, J, fits over the steamer, and is provided with the usual handle $n$. The steamer is also provided with a handle to facilitate its removal from the kettle. It is evident that the steamer B may be used separately and independently of the meal-warmer, or of any of the devices heretofore described as being adapted to and placed within the steamer.

We do not desire to confine ourselves to any particular form or constructions of the kettle used; and the various devices constituting our invention may be constructed of metal, porcelain, earthenware, or other suitable material.

Having now fully described our invention, what we claim as new, and desire to secure by Letters Patent, is—

1. The kettle A, in combination with the conical steamer B, having secured below its rim the horizontal flange C, said flange having a vertical rim or flange, $d$, and openings $a$ $b$, and the horizontal cut-off D, with openings $c$, substantially as and for the purpose set forth.

2. The combination, with the steamer B, having flange C, openings $a$ $b$, and cut-off D, with openings $c$, of the frame H, provided with openings $k$, for the reception of the vessel or vessels I, substantially as and for the purpose described.

In testimony that we claim the above we have hereunto subscribed our names in the presence of two witnesses.

THOMAS V. CURTIS.
A. MILTON ANDREWS.

Witnesses:
A. W. DURLEY,
C. W. WEST.